Aug. 30, 1960
R. L. TIMMS
2,950,799
APPARATUS FOR IDENTIFYING PAPER MONEY, OR
THE LIKE, AS GENUINE, AND FOR MAKING
CHANGE OR THE LIKE
Filed Feb. 7, 1952
8 Sheets-Sheet 1
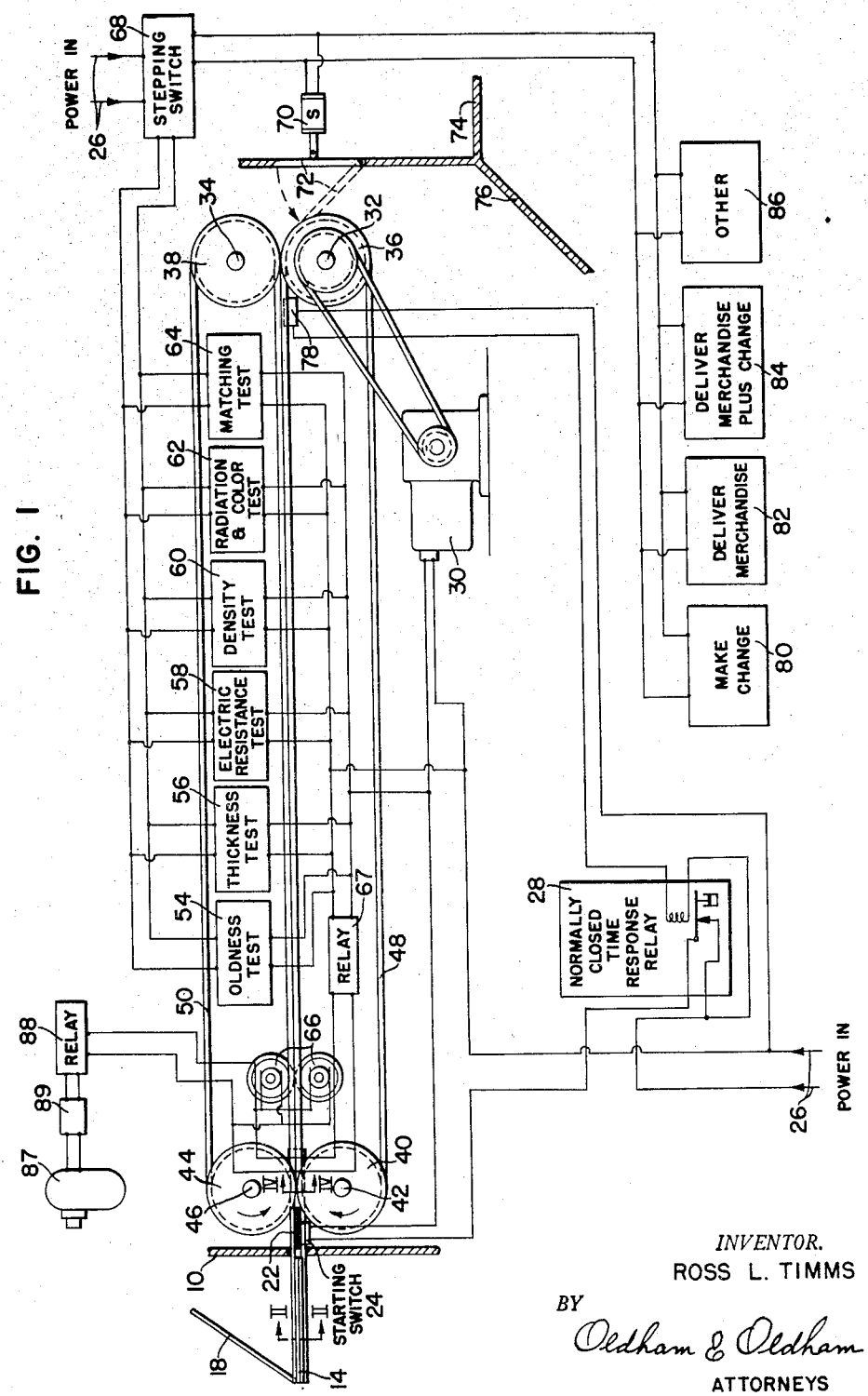
INVENTOR.
ROSS L. TIMMS
BY
Oldham & Oldham
ATTORNEYS Aug. 30, 1960

R. L. TIMMS 2,950,799

APPARATUS FOR IDENTIFYING PAPER MONEY, OR
THE LIKE, AS GENUINE, AND FOR MAKING
CHANGE OR THE LIKE

Filed Feb. 7, 1952

DENSITY TEST

*INVENTOR.*
ROSS L. TIMMS
BY
*Oldham & Oldham*
ATTORNEYS

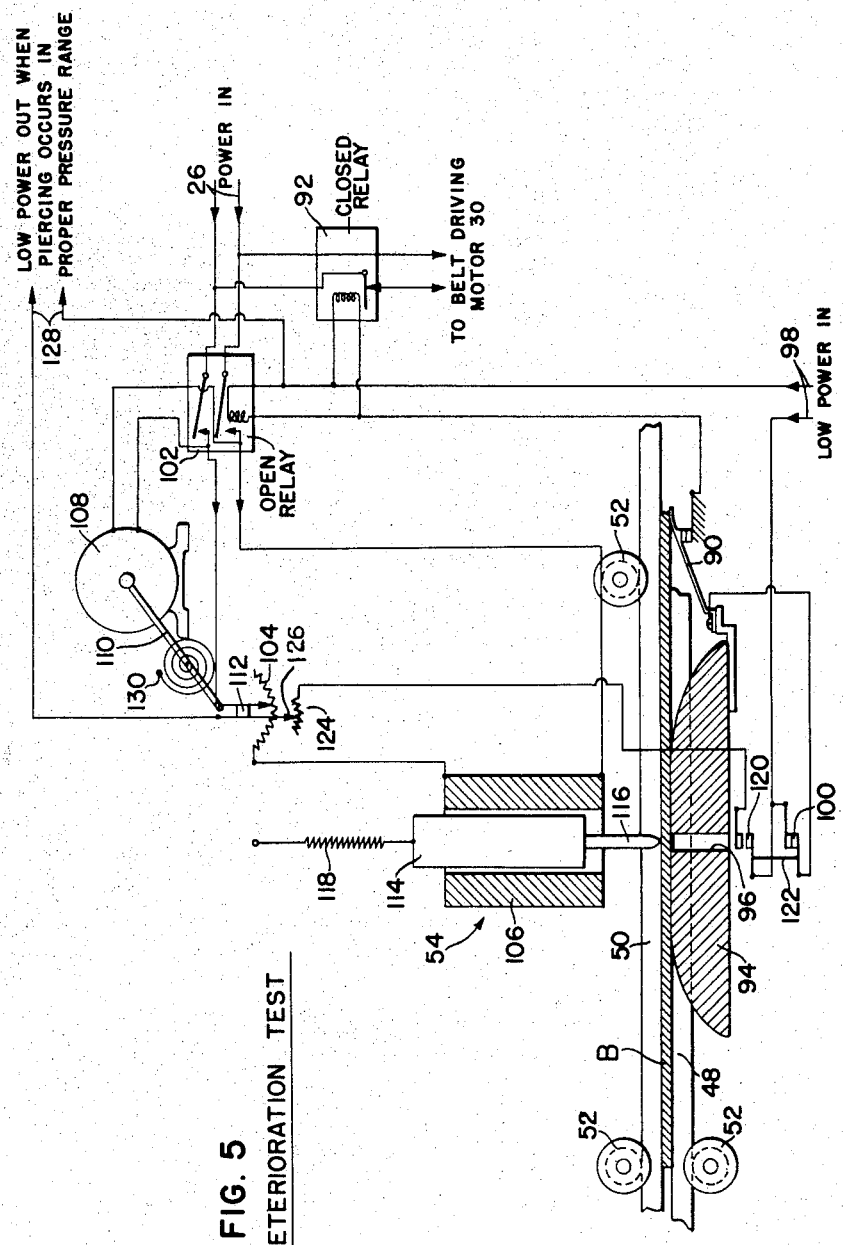

Aug. 30, 1960
R. L. TIMMS
2,950,799
APPARATUS FOR IDENTIFYING PAPER MONEY, OR
THE LIKE, AS GENUINE, AND FOR MAKING
CHANGE OR THE LIKE
Filed Feb. 7, 1952
8 Sheets-Sheet 4
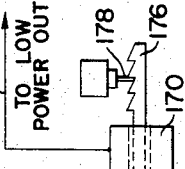
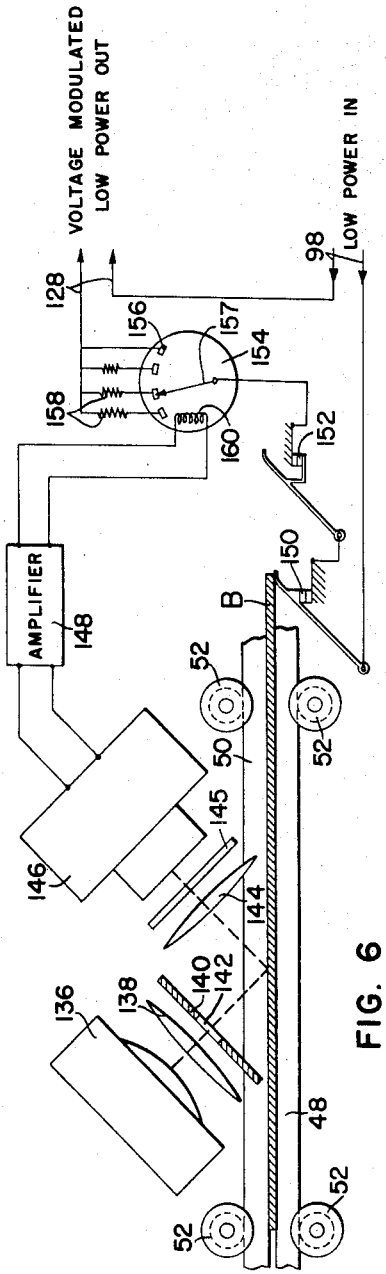
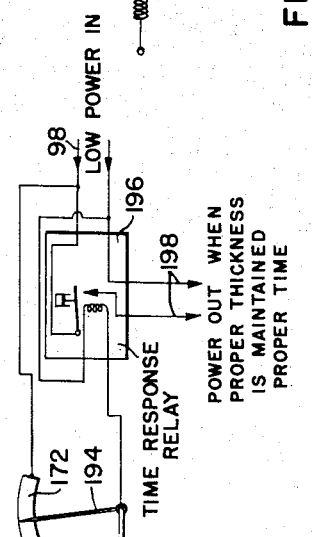
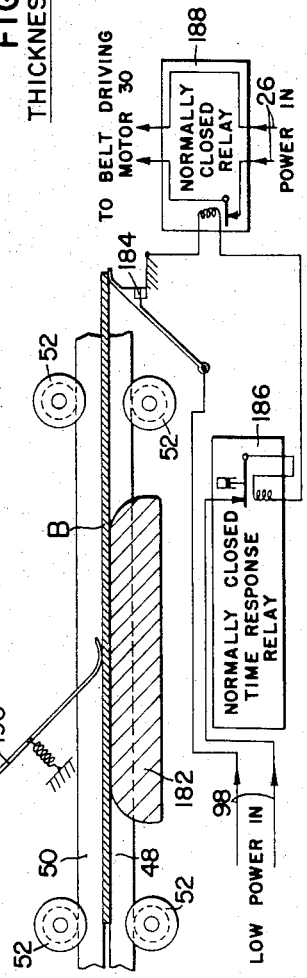
INVENTOR.
ROSS L. TIMMS
BY
Oldham & Oldham
ATTORNEYS

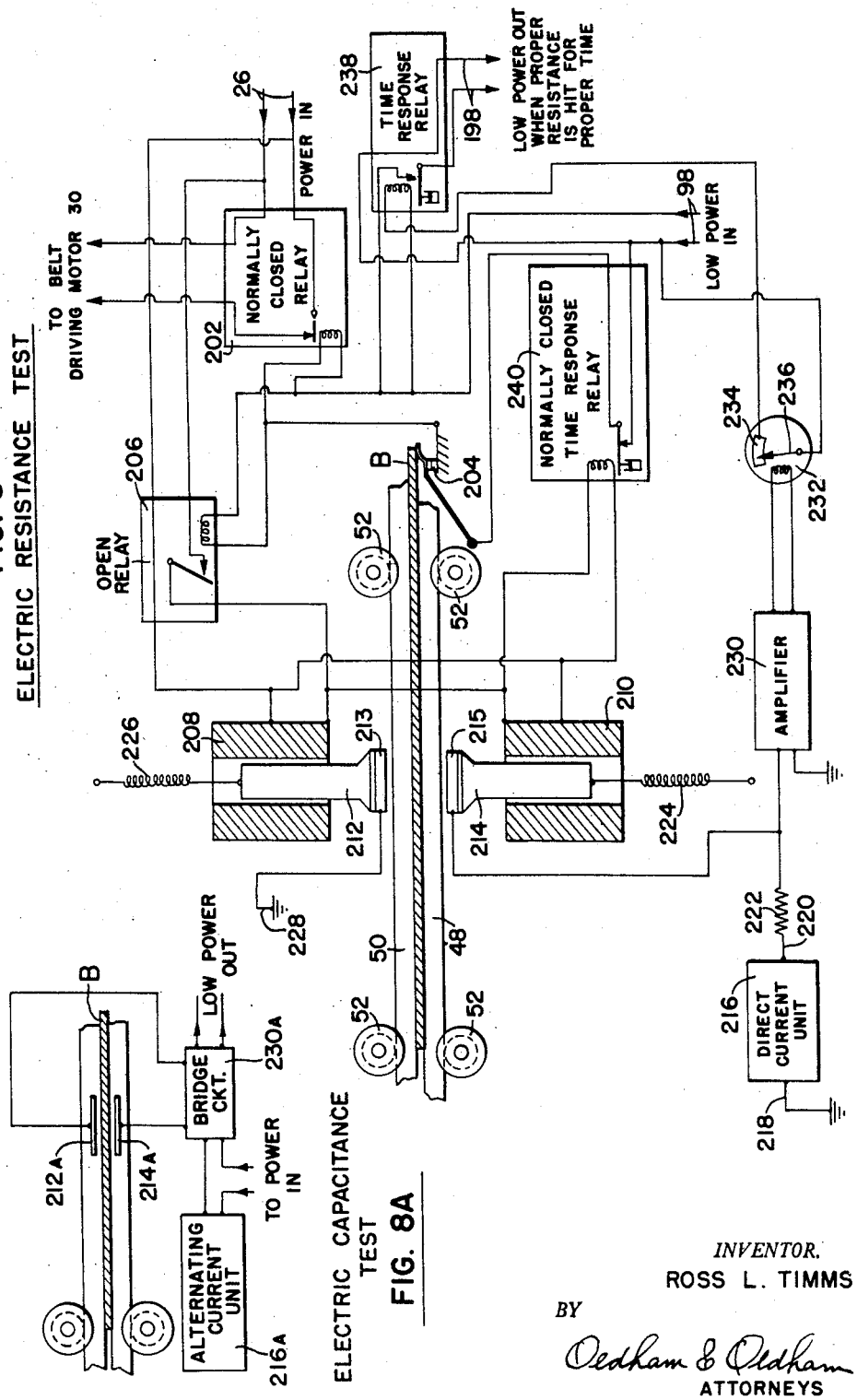

Aug. 30, 1960
R. L. TIMMS
2,950,799
APPARATUS FOR IDENTIFYING PAPER MONEY, OR
THE LIKE, AS GENUINE, AND FOR MAKING
CHANGE OR THE LIKE
Filed Feb. 7, 1952
8 Sheets-Sheet 6
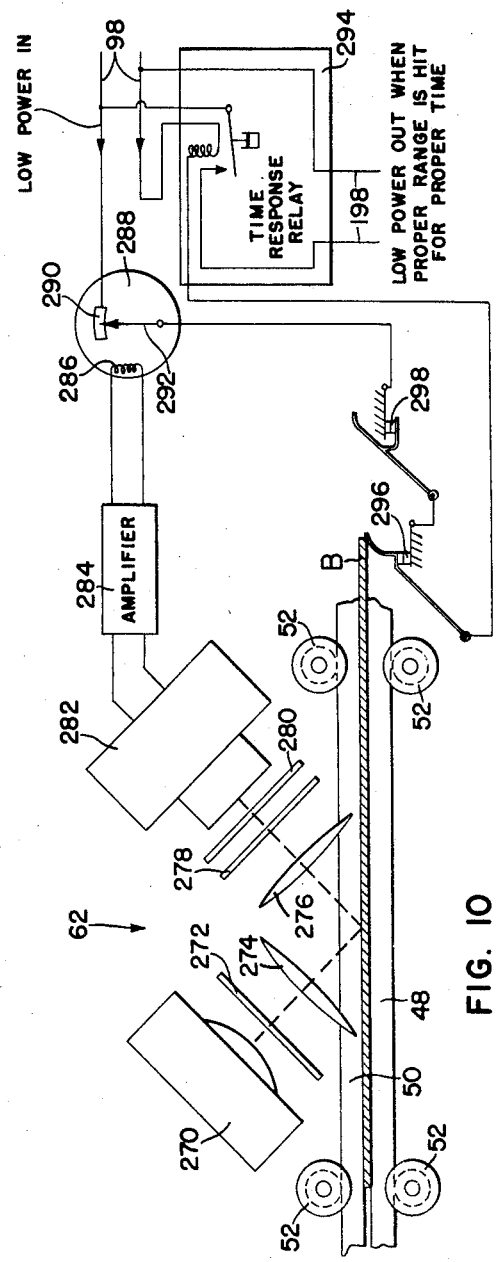
INVENTOR.
ROSS L. TIMMS
BY
Oldham & Oldham
ATTORNEYS

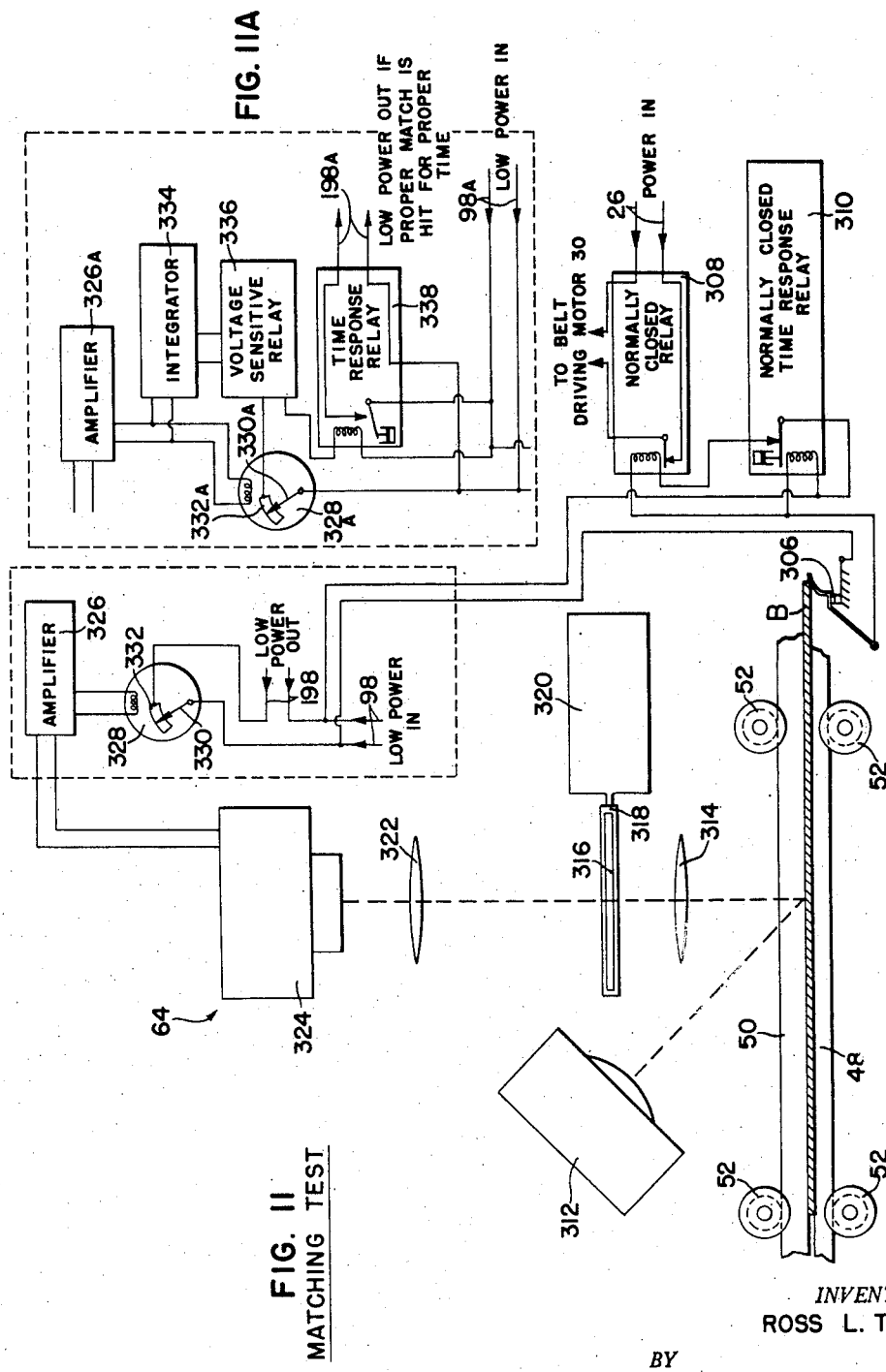

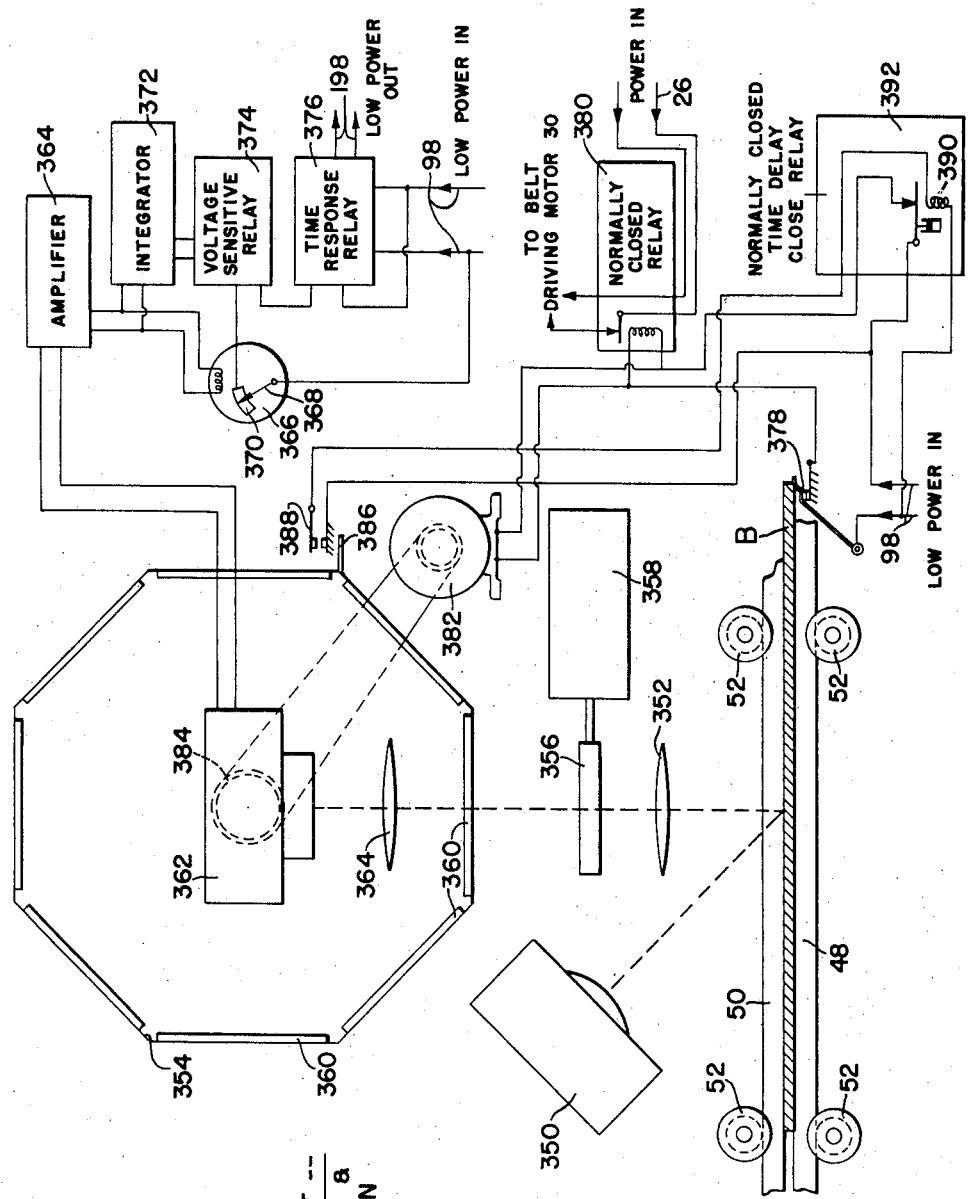

United States Patent Office 2,950,799
Patented Aug. 30, 1960

2,950,799

APPARATUS FOR IDENTIFYING PAPER MONEY, OR THE LIKE, AS GENUINE, AND FOR MAKING CHANGE OR THE LIKE

Ross L. Timms, Akron, Ohio, assignor of fifty percent to Alan Foster, Cincinnati, Ohio, five percent to Albert H. Oldham, Akron, Ohio, and five percent to Vernon L. Oldham, Akron, Ohio Filed Feb. 7, 1952, Ser. No. 270,326

8 Claims. (Cl. 194—4)

This invention relates to apparatus for identifying paper money as genuine, and, more particularly, for making change, for performing a vending function, for counting the paper money, and the like.

It is well known to vend various merchandise automatically by coin-controlled apparatus. However, the average purchaser of merchandise or services does not carry, and ordinarily cannot conveniently get a sufficient quantity of metal coins so as to extend the range of the vending equipment to a monetary value approaching or above a dollar. For example, before making from a pay phone a long distance telephone call which may cost several dollars or more, it is necessary for the caller to fill his pockets with quarters or other metal coins, and sometimes no source for such coins is available near the pay telephone which the caller wishes to use, and even if a cigar counter or other source of change is available, the change is often given grudgingly or not at all.

As a result, the automatic vending of merchandise or services above twenty-five cents or so has been complicated by the potential customer's lack of metal coins, and the vending of merchandise and services of higher price, for example of one dollar or more, has been decidedly handicapped.

The determination of genuine metal coins has progressed in the art to the point where known devices are very satisfactory, but so far as I am aware, no automatic apparatus is available for discriminating between genuine and spurious paper currency. Metal coins are, of course, much more stable than paper money which becomes dirty, moisture-laden, folded and wrinkled to materially complicate automatic determination.

It is the general object of my invention to avoid and overcome the foregoing and other difficulties of and objections to prior art practices and limitations by the provision of relatively simple, easily operated, self-contained automatic apparatus for receiving and identifying as genuine a piece of paper money, followed by the performance of a function, such as the making of metal coin change for the paper money, the vending of merchandise or service, the vending of merchandise or service plus the making of change, or by the counting of the paper money.

Another object of my invention is the provision of apparatus of the character described in which identification of the paper money and the performance of one or more of the indicated functions is achieved as rapidly as possible.

Another object of my invention is to provide a series of tests to which the paper money is subjected, and with the paper money being accepted as genuine if it successfully passes a selected plurality or number of the tests.

Another object of my invention is the provision of apparatus adapted to receive a bill, i.e., a piece of paper money, in a slide, and of means for conducting the bill and the test equipment relative to each other in automatic fashion so that the bill is subjected to usually a plurality of tests for genuineness, and is accepted as genuine, or is rejected as counterfeit.

Another object of my invention is the provision of apparatus which subjects the paper money to one or more of the following tests: Oldness test, thickness test, electric resistance test, density test, radiation and color test, and/or matching test.

Another object of my invention is to provide in apparatus of the character described an oldness test which may take the form of a controlled piercing operation or a reflected light determination from which data can be derived concerning the newness or oldness of the paper money so that determinations of the genuineness of the bill can be reached and also the genuineness limit of subsequent tests can be rearranged to compensate to handle either a new or an old piece of paper money.

Another object of my invention is to provide a thickness test for a piece of paper money, with the apparatus employed in this test examining the paper money for thickness in a selected spot as free of folds and wrinkles as possible so that the accuracy of the test will be an ultimum.

Another object of the invention is the provision of electric resistance equipment for determining the electrical resistance of paper money being tested, and usually employed in conjunction with this apparatus are means for bringing the paper money within required moisture-containing limits.

Another object of my invention is the provision of apparatus for testing the density of the paper money by means of radiant energy, such as radiation from a beta radiation source passing through the money to a ray pick-up means, such as an ionization chamber.

Another object of my invention is the provision of radiation and color test apparatus for paper money and including an examination of money with ultra-violet light and pick-up means for measuring the reradiation and color of the paper money under the ultra-violet light.

Another object of my invention is to provide a matching test between a piece of paper money and a negative of at least a portion of a genuine piece of paper money of like type, the positive image of the paper money being scanned or moved relative to the negative image to effect a matching of the positive and negative images and a measurement of the denomination or genuineness of the paper money being tested.

The foregoing objects of my invention, and other objects which will become apparent as the description proceeds, are achieved by the apparatus about to be described, typical embodiments of which are illustrated in the accompanying drawings, wherein:

Fig. 1 is a diagrammatic and schematic illustration in vertical section, in part, of one embodiment of the assembled test apparatus of my invention;

Fig. 5 is a diagrammatic illustration, partially in vertical longitudinal section, of the piercing type oldness test apparatus of my invention;

Fig. 6 is a view similar to Fig. 5 of a reflected light type of oldness test apparatus;

Fig. 6A is a view of a typical mechanism for effecting the repositioning of test limits in a later test apparatus by a modulated output from an earlier test apparatus;

Fig. 7 is a view similar to Fig. 5 of a thickness type measuring apparatus of my invention;

Fig. 8 is a view like Fig. 5 but of typical electric-resistance testing apparatus of my invention;

Fig. 8A is a view similar to a portion of Fig. 8 but illustrates a form of the invention adapted to perform a capacitance measurement;

Fig. 10 is a view similar to Fig. 5 of typical color and reradiation testing apparatus of my invention;

Fig. 11 is a view similar to Fig. 5 of typical matching test apparatus of my invention;

Fig. 11A is a view of the match integrating apparatus which may be substituted for the apparatus in the dotted box of Fig. 11; and Fig. 12 is a diagrammatic illustration of an alternative form of matching test apparatus of the invention.

Figure 9:
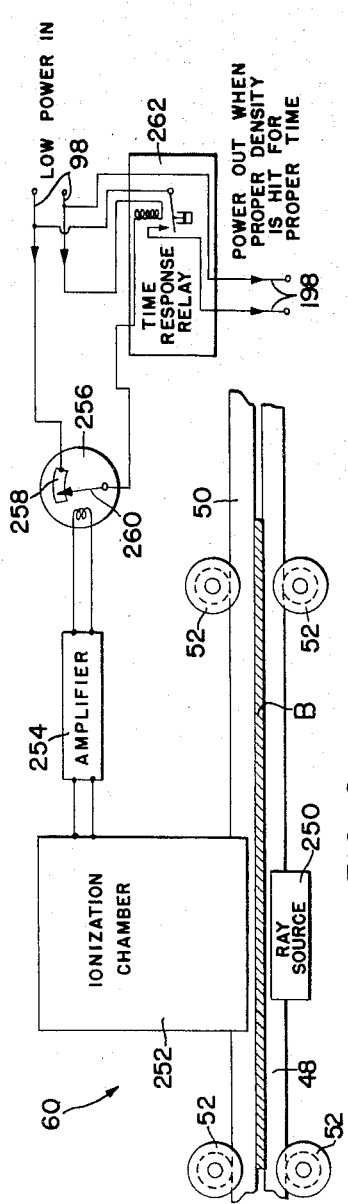
Fig. 9 is a diagrammatic illustration like Fig. 5 of typical density testing apparatus of my invention.

The term "paper money" has been largely used heretofore in referring to the article or articles to be identified by my testing apparatus, and this term is intended to include paper currency of all sizes, denominations, and countries of origin, and, in addition, to include bonds, documents, or other paper, textile, or colored articles which might be subjected to tests for genuineness, weave, composition, gloss or the like, by equipment of the character herein described and claimed. However, the apparatus of my invention is primarily designed for the determination of genuineness of United States paper money in lower denominations, for example, one-dollar, five-dollar, and ten-dollar bills. In order to shorten the designation of the article being tested it has been designated in the drawings as a bill and will be so described in the specification.

*General combination*

Figure 3:
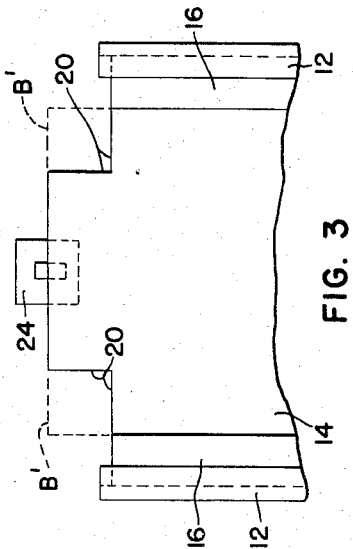
Fig. 3 is a fragmentary top plan view showing the inner end of the paper money or bill receiving slide of Fig. 2.
Figure 2:
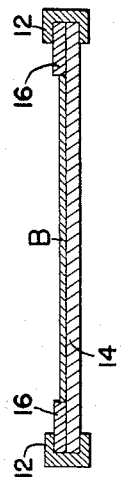
Fig. 2 is an enlarged fragmentary vertical cross-sectional view, taken substantially on line II—II of Fig. 1 and showing the paper money or bill receiving slide of the apparatus of Fig. 1.

Having reference to Fig. 1 of the drawings, the numeral 10 indicates a casing 10, largely broken away and housing the test apparatus of the invention. The front end of the casing 10, as shown in Figs. 1, 2 and 3, is provided with opposed horizontally positioned channels 12 which slidably receive a slide 14 to which a frame 16 is secured. The frame 16 defines at three sides a space adapted to receive a bill B shown in exaggerated thickness in Fig. 2, the bill being adapted to be held in flat position within the frame 16 by a lid 18 hinged to the slide 14 adjacent its outer end. The innermost corners of the slide 14 and lid 18 are cut away at 20, as seen in Fig. 3, so that corners B' of the bill B stick out in the manner indicated in dash-lines in Fig. 3.

When the slide 14 with bill therein is pushed into the casing 10 against the compression springs 22, the end of the slide 14 strikes a starting switch 24, of the self-locking type, to connect a power-in circuit 26 to normally closed relay 28 to drive a motor 30. In order to pick up the bill B from the slide and to carry it through the apparatus, suitable mechanism is provided which includes a drive connection from motor 30 to a shaft 32 geared by means (not shown) to a shaft 34 positioned parallel to and vertically above shaft 32. Shaft 32 carries a pair of pulleys 36, and shaft 34 carries a pair of pulleys 38, and the pulleys 36 are in alignment with pulleys 40 carried on a shaft 42, and the pulleys 38 are in alignment with pulleys 44 carried on a shaft 46 which is positioned above and parallel to shaft 42. The pulleys 36 and 40 carry a pair of suitable belts, such as V-belts 48, and pulleys 38 and 44 carry a second pair of belts, usually V-belts 50.

Figure 4:
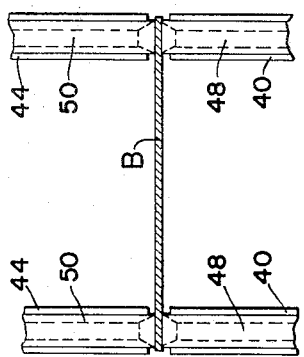
Fig. 4 is an enlarged fragmentary vertical cross-sectional view, taken substantially on line IV—IV of Fig. 1, and illustrating the belts and pulleys for conveying the paper money or bill through the test apparatus of Fig. 1.

Fig. 4 illustrates that the pulleys 40 and 44 and V-belts 50 and 48 carried by the pulleys are positioned in association with the end of the slide 14 so that as it is moved by the customer into the casing 10 to first start the driving motor 30, as described, the corners B' of the bill are moved into the bight of the V-belts 48 and 50, whereby the end of the bill is gripped and progressively pulled out of the slide and into a gripped position between the belts. The stretches of the V-belts 48 and 50 between the spaced pulleys are supported by small pulleys or rollers designated by the numeral 52 throughout the figures of the drawings illustrating the individual pieces of testing apparatus, it being understood that the additional supporting rollers 52 are employed in opposed or in mere supporting relation wherever it is found necessary or desirable upon the stretches of the V-belts.

In the manner described, the bill B is conveyed by the belts 48 and 50 to and through one or more tests which may include oldness test apparatus 54, thickness test apparatus 56, electric resistance test apparatus 58, density test apparatus 60, radiation and color test apparatus 62, and matching test apparatus 64.

It may be desirable to subject the bill B to a drying and pressing action prior to passing it any one of the test apparatus. This is preferably accomplished by positioning one or more pairs of heated rollers 66 on opposite sides of the bill in its travel between the pulleys 40 and 44 and the first piece of test apparatus. If only a drying action is desired, the heated rollers 66 may be replaced with infra red lamps or other suitable heating means adapted to bring the bill to a desired moisture content condition. Flow of electric current to the rollers 66 may be cut off automatically by a relay 67 after they have performed the desired pressing and drying operation.

It will be seen that the various pieces of test apparatus are electrically connected with the power-in circuit 26 so that they are energized to perform their respective test operations. The output of the several test apparatus 54, 56, 58, 60, 62, and 64 are electrically connected to a stepping switch 68 which is adapted to be advanced one step each time the bill B successfully passes a test. The stepping switch can be set so that it conects the power-in circuit 26 to an operating solenoid 70 when a selected number of the tests are passed by the bill B being examined. For example, if six tests are performed on the bill B the stepping switch 68 may be set to operate on the sixth tap of the stepping switch and only after the bill B has successfully passed each test with the stepping switch being advanced one step or tap after successful completion of each test. On the other hand, I particularly contemplate that if the bill B successfully passes some lesser number of the tests to which it is subjected, for example, say four or five of the tests, that the stepping switch 68 will be advanced only to the fourth or fifth tap, but this will be connected with the power-in circuit 26 so that the solenoid 70 is operated.

I have found, in this connection, that I am able to distinguish counterfeit from genuine bills by a series of tests of the character herein described even though the genuine bill does not pass every test to which it is subjected, and even though the counterfeit bill may pass one or even more of the tests. Each test not only serves to perform its function, but acts together with other tests to define a true line of demarcation between the genuine and a counterfeit bill. Of course, I likewise contemplate using a smaller number of tests than the number herein shown and described, and this is particularly true when the tests are employed which have been found to be most excellent in distinguishing between genuine and counterfeit bills. With certain of the test apparatus as hereinafter described a single test has been found to distinguish substantially 100% between genuine and counterfeit bills. In any event, it is the teaching of my invention as herein disclosed that the commercial embodiment of my apparatus may include any one or more of the tests and testing apparatus described, with the stepping switch 68 being connected to operate if the bill being tested successfully passes the test or a selected number of the tests to which it is subjected.

Assuming that the bill B being tested has successfully passed the selected number of tests to which it is subjected and that the stepping switch 68 has connected the power-in circuit 26 to operate the solenoid 70, the operation of the solenoid 70 throws a gate 72 from the full-line position shown in Fig. 1 to the dotted-line position illustrated and the bill B falls into a drawer or compartment 74 adapted to receive genuine bills. If the bill B has not passed the required test or tests, the gate 72 is not operated and the bill B after passing pulleys 38 and 36 falls into a reject chute or return passage 76. Return belts may be provided, if desired, to return the rejected bill to the front of the casing 10.

In the passage of the bill B from the last test apparatus to the pulleys 36 and 38, the front edge of the bill contacts a tripping switch 78 which operates through the normally closed, time response relay 28 to release the self-locking starting switch 24 so that the driving motor 30 comes to a stop and the apparatus is thus returned to its initial inoperative position. It will be understood that when switch 78 is closed by the front edge of the bill striking it, the time delay feature of the relay 28 causes it not to open until after a sufficient time delay so that the bill is carried on out from between the pulleys 36 and 38 to fall either into the genuine bill compartment 74 or into the reject chute 76. Perhaps I should also make clear that after the bill B has been introduced into the apparatus in the manner previously described by the customer it is necessary that the slide 14 be held in the casing for a period of several seconds, but then the customer can release the slide 14 so that it is automatically pushed out to its original position by means of the compression springs 22 previously mentioned.

It will be recognized that various functions can be performed by the bill-identifying apparatus described. For example, the power-in circuit 26 can be connected by the stepping switch 68 not only to the solenoid 70 but to a make-change apparatus 80, to a deliver-merchandise apparatus 82, to a deliver-merchandise plus change apparatus 84, or to some other apparatus 86, such as a counter mechanism. More specifically, if a dollar-bill has been identified by the apparatus of my invention, the make-change apparatus 80, of which there are various known types, can be adapted to deliver to the customer four quarters, ten dimes, or any other desired combination of metal coin change equaling the value of the bill examined. Or the deliver-merchandise mechanism 82 can be adapted to deliver a dollar's worth of merchandise or service to the customer, and mechanism of this type is likewise known. Still again, the mechanism 84 can be actuated to deliver merchandise plus metal coin change to the customer, for example, an eighty-nine cent article plus eleven cents in change. Or other mechanism 86, for example, a counter can be actuated, and particularly it might be noted that when actuating simple mechanism, such as a counter, that the number of tests employed in the apparatus can be reduced and mechanism can be associated with the front of the V-belts 48 and 50 for continuously feeding bills into the apparatus.

It may sometimes be desirable to photograph the users of the apparatus, for example, in case of an outbreak of attempts to falsely obtain money or merchandise from the apparatus. Thus, I may incorporate a movie camera 87 in the apparatus in a position to take a picture of the user of the apparatus, a few frames of movie film being taken of each user by a relay 88 and operating solenoid 89 connected in the circuit to motor 30. The relay 88 is of the tripping type which fires for a short time interval only and automatically resets itself.

*Piercing test apparatus*

Turning now to the individual test apparatus illustrated in Figs. 5 to 12, and particularly having reference to the oldness, i.e. relative deterioration or condition test apparatus 54 of Fig. 5, this comprises a piercing test mechanism for determining the strength or tear resistance of the bill being tested. As is well known, the paper employed in a bill is generally of very high grade quality, and as such has a higher strength than inferior papers often used in counterfeit bills. However, it has been found that this test shows such a variation between bills of various oldness that it is not very satisfactory in distinguishing between genuine and counterfeit bills. I have found that the test does give a good indication of oldness of a bill, and I particularly contemplate utilizing this test to determine the oldness of a bill and then employ this information to reset or realign other tests to corrected limits so that the said other tests can more accurately distinguish between a counterfeit bill and a genuine bill of the particular oldness determined by this piercing test.

I have found that in general the more usage the bill being tested has been subjected to, the softer and less strong it is, and the more subject it is to tearing in this piercing test. More specifically, the bill B gripped between the V-belts 48 and 50 is carried forwardly through the apparatus until the front edge of the bill strikes a micro-switch 90 which operates through a normally-closed relay 92 (which may be a part of relay 28) to shut off the power-in circuit 26 to the belt-driving motor 30 so that the V-belts 48 and 50 come to a stop and the bill B is positioned at rest over an anvil 94 having a hole 96 therein. A low-power-in circuit 98 supplies electric current through a normally closed switch 100 and through micro-switch 90 to operate normally closed relay 92 as will be evident from tracing through the circuit diagram. The low-power-in circuit 98 when closed by micro-switch 90 likewise closes normally-open relay 102 to connect the power-in circuit 26 through a potentiometer 104 with a solenoid coil 106, and the power-in circuit 26 is likewise connected by the relay 102 to a motor and gear box 108 which rotates a shaft 110 connected to the arm 112 of the potentiometer 104 so that as the motor and gear box 108 is driven, the amount of resistance created by the potentiometer 104 is gradually reduced to thereby progressively increase the voltage passed to the solenoid 106.

The solenoid 106 slidably receives a plunger 114 carrying a pin 116 in alignment with the hole 96 in the anvil 94, the plunger 114 being movable against the tension of a spring 118. As the voltage and current flow into the solenoid 106 gradually increases in the manner described, the force tending to move the pin 116 into and through the bill B is gradually increased until such time as the pin 116 pierces down through the bill B. It will be understood that the solenoid 106 and anvil 94 are so positioned in relation to the micro-switch 90 that the pin 116 engages with the bill B in an area of the bill which is least subject to folds, wear or damage. I have found that one of the best portions of a bill is around the left eye, the eye brow, or the forehead above the left eye on a one-dollar United States bill, and is in a very similar position on a five-dollar bill. With respect to ten- and twenty-dollar bills, I prefer to work on the right eye, eyebrow, or forehead of the person pictured. It is unlawful to in any way deface or damage paper currency, and the piercing test herein described may be objected to for this reason. However, I preferably use a very small diameter pin 116, for example, 1/32 of an inch, which does very little damage to the bill.

As the pin 116 pierces down through the bill B and into the hole 96 in the anvil 94, the end of the pin 116 engages and closes a switch 120 and at the same time operating through post 122 opens switch 100. Switch 120 is connected through an arcuately small potentiometer 124 and a contact arm 126 to a low-power-out circuit 128. The potentiometer arm 126 is mounted on but insulated from the potentiometer arm 112, so that the potentiometer arm 126 makes contact with the potentiometer 124 only if the potentiometer arm 112 is within the proper piercing limits identifying a genuine bill. Additionally, the particular position of the potentiometer arm 126 on the potentiometer 124 controls the amount of voltage out in the low-power-out circuit 128 to give an indication in the circuit whether the bill being tested is new or old, i.e., not deteriorated or deteriorated. It will be understood that with an old or deteriorated bill less piercing power is required and the potentiometer arm 126 will be farther to the right on the potentiometer 124 than is the case with a newer, stronger bill. In any event, the low-power-out circuit 128 is fired when piercing of the bill has occurred within the proper range and this proper range is determined by the potentiometer arm 126 striking the potentiometer 124. Likewise, the voltage out in the low-power-out circuit 128 is determined by the position of the potentiometer arm 126 on the potentiometer 124 so that the low-power-out circuit 128 provides, in terms of voltage difference, an indication of the oldness or the newness of the bill being tested. The firing of the low-power-out circuit 128 can be used to operate stepping switch 68 or to perform other functions, as hereinafter described.

I have already stated that the piercing movement of the pin 116 through the bill B has opened switch 100 which breaks the low-power-in circuit 98 to the relay 102 to allow the tension spring 118 to withdraw the pin 116 from the bill B and return plunger 114 to its initial position. Opening of the relay 102 likewise allows motor and gear box 108 to reset itself to initial position under the action of spring 130. The opening of switch 100 also allows normally closed relay 92 to reclose again supplying driving power to the motor 30 from the power-in circuit 26 so that the belts 48 and 50 are again driven to move the bill B onto the next test apparatus.

*Reflected light test apparatus*

The test apparatus of Fig. 6 is, in one embodiment or application of the principles of my invention, another type for testing oldness or relative deterioration of a bill, this apparatus being of the reflected light type and including a bill B gripped between V-belts 48 and 50, and with supporting rollers 52 being shown in opposed relation for aligning and supporting the V-belts.

The apparatus includes a light source 136 positioned at an angle, for example 45°, with the surface of the bill and directing a light beam through a lens or a lens system 138 and a shield 140 having an open center 142 against the surface of the bill. The reflected light from the bill passes through a lens or a lens system 144 to a photo-cell pick-up 146 connected to an amplifier 148. A low-power-in circuit 98 is connected through a micro-switch 150 which is normally open and through a normally closed micro-switch 152 and through a galvanometer 154 to a low-power-out circuit 128.

The term galvanometer, galvanometer unit, or meter, is used throughout the specification and claims to denote any type of suitable response element capable of actuating control circuits in proportion to the input applied thereto.

The meter 154 has a plurality of arcuately-short contacts 156 positioned in slightly separated arcuate alignment with each other and adapted to be engaged in turn by the needle or arm 157 of the meter. Each one of the contacts 156 is connected through a different resistance 158 with the low-power-out circuit 128. The output of the amplifier 148 is connected to the coil 160 for moving the arm 157 of the meter.

It should be noted that the various components in the test apparatus herein described and to be described, such as light source 136 and amplifier 148 in Figure 6, may all be simultaneously energized by additional contacts on starting switch 24, Figure 1, or may be individually energized as the bill B passes into each test along its path through additional contacts on the various switches such as micro-switch 150, Figure 6. The choice would depend upon warm-up time requirements, the number of tests being employed, and the consequent length of time the various components would be energized without being used.

In the operation of the apparatus of Fig. 6 as the front edge of the bill B moves into engagement with the micro-switch 150 to close it, the low-power-in circuit 98 is connected to the low-power-out circuit 128 through the needle 157 and one of the contacts 156 and its associated resistor 158. The position of the needle 157 on the meter 154 is determined by the amount of light reflected from the bill B, the light passing from the light source 136 through the lens system 138 against the surface of the bill, back through the lens system 144 and into the photo-cell 146. The amount of light is measured by the photo-cell and the output of the photo-cell passing to the amplifier 148 produces a current flow in the meter coil 160 connected to the output of the amplifier to position the needle 157 of the meter 154. The position of the needle 157 thus determines the amount of voltage flowing in the low-power-out circuit 128, and this voltage is proportional to the amount of light reflected from the bill.

I preferably position the micro-switch 150 and the light-producing and pick-up mechanism so that the bill is examined on a normally white portion thereof lying, for example, to the left of the center picture of the bill and above or below the bill center so as to stay away from any possible creases in the bill and away from any printing on the bill. Usually the older the bill is the dirtier is the white portion of the paper of the bill and the less is the output of the amplifier 148 so that the needle 157 of the meter 154 is towards the left side of the series of contacts 156 forming its scale. Dependent upon the positioning of the resistors 158, the voltage flowing in the low-power-out circuit 128 can be either low for an old bill and successively higher for progressively newer bills, or vice versa.

In the test of Fig. 6 on the bill B, it is evident that the bill is not stopped in its travel with the belts 48 and 50, although it could be if desired by use of the mechanism of Fig. 5. The positioning of the normally open micro-switch 150 and the normally closed micro-switch 152, together with the positioning of the light source and the photo cell, determines the portions of the bill subjected to this test. The closing of micro-switch 150 initiates the test, and the test is stopped as the front edge of the bill strikes the micro-switch 152 to open it and terminate the flow of electric current from the low-power-in circuit 98 to the low-power-out circuit 128.

The test on the bill accomplished by the apparatus of Fig. 6 can, like the apparatus of Fig. 5, be used to operate stepping switch 68 if the bill being tested is within the required limits, but more often, the apparatus of Fig. 6 is utilized to re-position the limits of other test apparatus hereinafter to be described in order to compensate for the oldness or deterioration of the bill being tested. By way of example only, and illustrative of what I may do with the voltage modulated or determined low-power-out circuit 128, reference should be had to Fig. 6A, in which I have illustrated the low-power-out circuit 128 connected to a solenoid 170 which has its plunger secured to a contact plate, such as contact plates 172, 258, 234, etc., the other end of the contact plate being connected to a tension spring 174. The solenoid 170 has a portion of its plunger formed as a ratchet rack 176 with an electrically released locking pawl 178 being provided to hold the solenoid plunger and contact in the position to which it has moved by the voltage in the low-power-out circuit 128. The electrically released pawl 178 is released when the self-locking starting switch 24 is opened after the test run of the bill has been completed. Reference will be made hereinafter to the arcuate contact plates 172, 258, 234, etc.

I might also note here that the apparatus 170, 172, 174, 176 and 178 can be operated by the voltage-modulated output of the piercing type test apparatus of Fig. 5.

It should be noted that if the results of the piercing test or the reflected light test fall outside the selected limits that no compensating bias or resetting of the limits of subsequent tests will take place. This failure of compensating bias may be used directly to reject the bill being tested or the subsequent compensating tests may be relied upon to reject the bill depending upon the number of tests being used in the particular embodiment and the degree of accuracy required. Or, the piercing test and reflected light test may merely form part of the series of tests performed with the bill being tested being required to pass a selected number of these tests before being accepted.

In a second embodiment or application of the principles of my invention with respect to the reflected light test apparatus of Fig. 6, I may include a Polaroid screen 145 in the assembly in advance of the photocell 146, and with the screen being turned in its own plane usually so that the minimum amount of light is passed to the photocell. I have found this test to be more effective in determining the genuineness of a document than the test without a Polaroid screen, and the output of the test with the Polaroid screen can be used to operate the stepping switch 68. Of course, the piercing test apparatus of Fig. 5 can be used to reset the limits of the test apparatus of Fig. 6, if desired.

Thickness test apparatus

Turning now to the thickness test apparatus of Fig. 7, the bill B still gripped by V-belts 48 and 50 backed up by rollers 52 passes to position over an anvil 182 at which time the front end of the bill strikes the normally-open micro-switch 184 which closes to connect a low-power-in circuit 98 through a normally closed time response relay 186 with a normally closed relay 188 (which may be a part of relay 28), this relay 188 connecting a power-in circuit 26 with the belt driving motor 30. Closing micro-switch 184 opens relay 188 and stops the motor 30 and the bill B comes to rest on the anvil 182 and stays there until relay 186 opens. The relay 186 is timed to open after the few seconds delay necessary to make an accurate reading of thickness on the bill B. However, I do contemplate not stopping the bill B in order to measure its thickness, and this can be accomplished by the use of a normally open micro-switch in association with a normally closed microswitch, such as the switches 150 and 152 of Fig. 6.

In either event, whether the bill is stopped for a thickness measurement or whether it is measured as it is continuously moved, the thickness measurement is taken in a portion of the bill which is least subject to deterioration as a result of folds or wear. I have already described the portions of the bill which I preferably examine with the piercing test of the apparatus of Fig. 5, and I preferably measure for thickness on these same portions. The thickness measurement is accomplished by any one of a variety of conventional thickness measuring means, for example, magnetically, as by the separation of the magnetic core; mechanically; or by other known mechanism. I have diagrammatically illustrated a simple mechanical thickness means including a lightweight, counterbalanced arm 190 operating through a gear train 192 to a needle 194 adapted to make electrical contact with an arcuately short contact plate 172 when the thickness of the bill being tested is within the proper thickness range.

The arcuate length of these "contact plates," such as 172, is chosen to define the limits of the permissible range of thickness, resistance, etc., of the bills it is desired to accept, as will be understood.

I have previously described in conjunction with the apparatus in Fig. 6 how the contact plate 172 can be repositioned to compensate for older or newer bills. It will be understood in this connection that the older a bill is, the more it has grown in thickness, as a general rule, and I have found that compensating the thickness test herein described for the oldness or newness of the bill makes the thickness test become quite a good test for distinguishing between genuine and counterfeit bills.

Genuine U.S. bills run about between .0034 and .0039 inch, with very old bills measuring as much as .0043 inch. Counterfeit bills usually are thicker. A contact plate having a length equal to .0005 inch of bill thickness may be used in this test.

The needle 194 and contact plate 172 are connected in an electric circuit so that the low-power-in circuit 98 is connected through a time response relay 196 to a low-power-out circuit 198 when proper bill thickness is measured and maintained for a proper time. As previously indicated, the low-power-out circuit 198 can be employed to operate the stepping switch 68 if the bill being tested has passed the thickness test.

Electric resistance test apparatus

The electric resistance test apparatus of Fig. 8 includes a bill B, belts 48 and 50, and belt-supporting idler rollers 52. The power-in circuit 26 is connected through a normally closed relay 202 (which may be a part of relay 28) to the belt driving motor 30, but the front edge of the bill B striking and closing the normally open micro-switch 204 connects the low-power-in circuit 98 with the relay 202 to open it and to stop the drive to the belt-driving motor 30. Simultaneously, the low-power-in circuit 98 closes normally open relay 206 to connect the power-in circuit 26 with a pair of solenoids 208 and 210 to move plungers 212 and 214 into contact with opposite sides of the bill B.

A direct current unit 216 has one side 218 of its output connected to ground, and the other side of its output 220 connected through a resistor 222 to a contact 215 carried by the plunger 214. A tension spring 224 resists inward movement of the plunger 214. The other plunger 212 likewise is connected to a tension spring 226, and the plunger 212 carries a contact 213 which is in turn connected to ground 228. Thus, during test, an electric current flow is established from the direct current unit to the contact 215, through the bill B, on out through the contact 213 and back to ground.

An amplifier 230 is likewise connected to the resistor 222 and the output of the amplifier is connected to the operating coil of the galvanometer 232 having an arcuately short contact plate 234 adapted to be electrically engaged with the needle 236 of the galvanometer to complete an electric circuit from the low-power-in circuit 98 to a time response relay 238 and to a low-power-out circuit 198 when the bill B being tested indicates an electric resistance within the proper range for a time interval sufficient to operate the time response relay 238.

It will be understood that other circuits for measuring the electric resistance of the bill can be employed rather than the particular circuit shown, it being kept in mind that the electric resistance of a genuine bill varies greatly with the moisture content which naturally varies greatly from the bill tightly clutched in the hot, moist hands of the small boy to the crisp new bills in a bank president's wallet. Because of this wide variation, it is normally desirable in a resistance test of this type to bring the moisture content of the bill to a standard condition, as by drying by the heated rollers described herein. Generally speaking, relatively dry, genuine bills have a resistance on the order of thousands of megohms, while moist bills have a resistance of tens or hundreds of megohms. Dry counterfeit bills have been found in general to have a resistance well below that of the dry genuine bills so that with equipment having high fidelity, stability and reliability at quite high resistances, they can be distinguished from the genuine bills. However, the electric resistance test should be made upon a part of the most favorable portion of the bill other than the exact spot upon which the piercing test, if used, has been conducted, since the slight hole left by the piercing test might introduce undesired variations in the resistance of the bills.

In Figure 8A is shown a capacitance measuring apparatus that could be substituted for the resistance contact circuit in Figure 8 to achieve this alternative form of measurement. Here the capacitor plates 212a and 214a correspond to the contacts 213 and 215, the alternating current unit 216a to the direct current unit 216 and the bridge circuit 230a (which may be of a type well known to the art) corresponds approximately to the amplifier 230. The galvanometer unit 232 will in this case be set to operate within the permissible range of genuine money dielectric constant or power factor values to control the output of the test in a manner similar to that in which the resistance test controls it.

It will be recognized that the position of the arcuate contact 234 in the galvanometer 232 can be re-positioned by the apparatus of Figs. 5 or 6 in order to compensate for the oldness or the newness of the bill being tested.

Completing the description of the apparatus of Fig. 8, a normally closed time response relay 240 has its contact points connected in series with the micro-switch 204, and the operating coil of this relay is connected in parallel with the solenoids 208 and 210. This arrangement is such that the relay 240 after being energized stays closed for the necessary number of seconds required to complete the electric resistance test at which time it operates to open. This breaks the flow of current to relays 202 and 206 to shut off the flow of current to solenoids 208 and 210, whereupon their respective springs 226 and 224 return the solenoid plungers 212 and 214 to a clearance position with respect to the bill B. The relay 202 simultaneously reapplies the power-in circuit 26 to the belt driving motor 30 to move the bill B onto the next station or test apparatus.

The low-power-out circuit 198 when actuated by a genuine bill operates the stepping switch 68 in a manner previously described. The arcuate length of the contact plate 234 of the galvanometer 232 determines the range of the acceptable electric resistance measurement, and it will be recognized that when the resistance measured is too high or too low to be acceptable that the needle 236 does not engage the contact plate 234 to energize the low-power-out circuit 198. The sweeping of the needle 236 across the contact plate 234 does not operate the low-power-out circuit 198 because the time response relay 238 does not have time to fire. The needle 236 must come to rest upon some portion of the contact plate 234 for the response time of relay 238 in order to fire the low-power-out circuit 198.

*Density test apparatus*

The density test apparatus of Fig. 9 is relatively simple and includes the bill B, belts 48 and 50, and belt-supporting rollers 52. In this test, the bill B need not come to a stop, but is continuously passed between a ray source 250 and a pick-up means for measuring any rays passing through the bill. The ray source 250 comprises any suitable source of radioactive material, for example, one generating beta rays, and the pick-up means have been illustrated as comprising an ionization chamber 252, the output of which passes to an amplifier 254 in turn connected to the operative coil of a galvanometer 256 having an arcuately short contact plate 258 adapted to be engaged by the needle 260 of the galvanometer. A low-power-in circuit 98 is connected to the contact plate 258 and through the needle 260 to a time response relay 262 so that when a proper density is recorded by the galvanometer 256 for a sufficient time interval to operate the relay 262, current flows in the low-power-out circuit 198 to fire the stepping switch 68.

As previously described, the position of the arcuate contact plate 258 in the galvanometer 256 can be re-adjusted to compensate for oldness or newness of the bill being tested.

*Color and reradiation test apparatus*

The apparatus of Fig. 10 tests for color and reradiation, and in this test, the bill B can either be stopped for the test, for example, with means such as previously described, or the bill can be continuously moved with the test mechanism only functioning to measure over a limited area or areas of the bill being tested, for example, by the use of the on and off micro-switches 150 and 152 of the test apparatus of Fig. 6.

More specifically, this test apparatus of Fig. 10 might likewise be designated as fluorescence test apparatus in that it includes an ultra-violet light source 270 positioned at an angle, such as an angle of 45° with the surface of the bill B. The ultra-violet light from the source 270 passes through a filter or a filter system 272 and a lens or a lens system 274 before it strikes the surface of the bill, and with the reflected light or reradiation from the fluorescence of the bill passing at a similar angle, for example 45°, through a lens or a lens system 276, a light polarizing screen or filter, such as a "Polaroid" screen 278, and a filter or a filter system 280 to a photocell pick-up 282.

The output of the photocell 282 is connected to an amplifier 284 and its output is connected to the operating coil 286 of a galvanometer 288 having an arcuately short contact plate 290 adapted to be engaged through the arc of the contact plate by the needle 292 of the galvanometer. A low-power-in circuit 98 is connected through the contact plate 290 and needle 292 to the operating coil of a time response relay 294 which when actuated for the proper time closes or fires to operate the low-power-out circuit 198 to operate stepping switch 68. Contact plate 290 can be arcuately re-positioned by the oldness test apparatus, as previously described, if desired.

However, in series with the operating coil of the relay 294 are normally open micro-switch 296 and normally closed micro-switch 298 adapted to be engaged in turn by the front end of the bill B. The position of the micro-switches 296 and 298 is such that the bill B is examined for fluorescence on one or more areas of the bill, and I have found that this test is most effective when performed upon the seal area of United States currency and upon a white portion of the bill. A second pair of micro-switches, like switches 296 and 298, can be utilized to get a separate response from a second portion of the bill, or as above indicated, the bill may be stopped in turn to take first a reading on the seal area and second on a white area of the bill.

The ultra-violet light source 270, as employed in one particular embodiment of my invention, employed a so-called small wave length ultra-violet light, ca. 3650 A.U., filtered through a 2 mm. Corning 5874 filter glass identified in the drawing by the numeral 272. The actual source of the ultra-violet light was a General Electric AH–4 100-watt mercury arc. The light-polarizing screen 278 comprised a piece of Polaroid-J film in a suitable frame so that the Polaroid screen could be revolved through 90° in its own plane. The filter system 280 is generally a narrow band pass filter similar to those described to limit the wavelength of the light passing to the photo cell 282. The maximum intensity of the light passing to the photo cell 282 was determined by rotating the Polaroid-J film screen 278, and with this position of the film designated as the perpendicular, the Polaroid screen was turned to angles of 45° and 90° from the perpendicular. It was discovered that the best results were obtained with the Polaroid screen 278 at 90° from the perpendicular, which was found to cut out extraneous wave lengths and improperly reflected light, and very excellent results were then obtained in distinguishing between genuine and counterfeit bills.

*Matching test apparatus*

The matching test apparatus of Fig. 11 includes a bill B, V-belts 48 and 50 and idler rollers 52 for the V-belts. The micro-switch 306 is normally open but is closed by being engaged by the front end of the bill B, and when closed closes a circuit from the low-power-in circuit 98 to the normally closed relay 308 (which may be a part of relay 28) to open this relay to cut off the flow of current from the power-in circuit 26 to the belt driving motor 30 so that the bill B comes to a stop. A normally closed time response relay 310 is connected in the circuit to the relay 308, with the relay 310 functioning to cut off the flow of electric current to the belt driving motor 30 for the required number of seconds to complete the matching test herein described. Thereafter, the time response relay 310 opens, thereby breaking the flow of current to the operating coil of the relay 308 to return the relay 308 to closed position to thereby connect the power-in circuit 26 with the belt-driving motor 30 to move the bill B onto the next test apparatus.

Positioned above the bill B when it is brought to rest is one or more white light sources 312 which direct a beam of light at an angle other than a perpendicular towards the surface of the bill, for example, at an angle of 45°. Usually the light 312 is concentrated upon a portion of the bill best adapted for matching, i.e., complementary alignment with a negative of an identical portion of a genuine bill, and I have found that the best spots on U.S. currency are as previously described in conjunction with the piercing test. Positioned at an angle, for example 90°, from the bill surface and focusing on the selected portion of the bill some one-half inch in diameter is a lens or lens system 314 which enlarges the selected portion of the bill and superimposes this positive image upon an enlarged negative image, to substantially the same orientation and scale, of an identical portion of a genuine bill. The negative 316 is mounted around its edges in a frame 318 carried by mechanism 320 which is adapted to move the frame 318 and negative 316 in a cyclic or periodically repeated scanning or match seeking motion relative to the position image focused upon the negative by the lens system 314. Usually this scanning motion moves the frame 318 in both a lateral and a longitudinal direction, as for example, a slow longitudinal movement plus a rapid lateral movement, in the plane of the negative to hunt or seek substantially a match or complementary alignment, between the enlarged positive image and the negative.

In addition, if greater accuracy is desired a third motion in the relative movement of the images may be added to rotate one of the images in relation to the other in the same plane to insure rotary alignment of the images, and a fourth motion, if desired, may be added to compensate for possible shrinkage of the bill being tested by focusing or movement of one of the images toward or away from the other.

It will be recognized that should the match be perfectly effected that black portions of the positive cover white portions of the negative and white portions of the positive cover black portions of the negative and no light will flow through the lens system 322 to the photocell pick-up 324. However, a perfect match or complementary alignment is not ordinarily effected, but even if an exact match is not consummated there is a definite diminishing of the amount of light passing through the photocell 324 when a match point is approached or substantially reached. Then, as shown in Figure 11, by feeding the output of the photocell 324 to an amplifier 326 having the output thereof connected directly to a galvanometer unit 328 having thereon needle 330 and short arcuate contact 332, I am able to energize the output circuit only when a substantial match or complementary alignment occurs. This energization may then be used to move the stepping switch to indicate the bill has passed this test.

In the operation of apparatus of the character described, I have discovered that there are a number of spurious or false matching points so that the output of the amplifier will rise and fall a plurality of times before a true complementary alignment or substantially a true complementary alignment and its consequent matching voltage drop is achieved.

I have found that the voltage changes resulting from spurious match points is greater in operations upon genuine bills than in operations upon counterfeit. Accordingly, I may and preferably do attach an integrator 334 to the output of the amplifier 326A, the integrator adding up the changes in voltage resulting from the spurious or false matches, and the output of the integrator being attached to a voltage sensitive relay 336 which is fired or operated when the voltage added up by the integrator 334 attains the predetermined amount. Closing of the voltage sensitive relay 336 completes the circuit to a time response relay 338 if the needle 330A of the galvanometer 328A is in engagement with the contact plate 332A. Closing the time response relay 338 closes a low-power-out circuit 198A to operate the stepping switch 68 or to perform any other desired function.

It will be recognized that the low-power-out circuit is closed when a true or a substantially true match is obtained between the bill B being tested and the negative 316 resulting in a dip in the galvanometer 328 to bring the needle 330 into engagement with the arcuately short contact plate 332, as shown in Fig. 11 or when the integrator 334 has added up the changes in voltage resulting from the spurious or false matches between the bill and negative in an amount equal to operate the voltage sensitive relay 336, as shown in Fig. 11a.

I have found that the matching test described, when employed in conjunction with an enlarged portion of a bill, for example, over an area about ½" square in the region of one of the eyes or eyebrows of the face on a bill, and usually including a portion of the cross-hatching within the oval of the picture and to one side of the face, provides a relatively efficient test. For example, I have been able to eliminate with this test one hundred percent of counterfeit bills tested and to accept one hundred percent of genuine bills tested.

*Denomination and serial number matching apparatus*

The matching apparatus shown in Fig. 12 is particularly adapted to the determination of the denomination of a bill, for example, whether or not it is a one, a five, a ten, a twenty, or some other bill denomination. Likewise, with this test apparatus, I am able to examine for counterfeit serial numbers on a counterfeit bill. It is a well known fact that substantially all counterfeit bills produced in a single batch will contain the same serial number. In other words, the serial number is not changed with each bill as is the case in a genuine bill. If during a particular period of time it is known that only, for example, three different batches of counterfeit money are in circulation, I obtain the serial numbers of these three groups of bills and incorporate these serial numbers in my apparatus and then subject the serial numbers of a bill inserted in my test apparatus to a comparison with these counterfeit serial numbers, whereby the bill being tested can be identified as a counterfeit should it bear one of the counterfeit serial numbers.

I accomplish the results described by the provision in the apparatus of Fig. 12 of a pair of V-belts 48 and 50 supported by idler rollers 52 and adapted to grip a bill B for testing. A pair of lights 350 are positioned to illuminate the portion of the bill B with which a comparison is to be made, for example, the number indicating the denomination of the bill or the serial number of the bill. A lens or lens system 352 is positioned, as for example vertically with respect to the illumined area of the bill so that the area is focused on the surface of a polygonal shaped drum, generally indicated at 354, through a prism system 356 carried by scanning mechanism 358 which is adapted to tilt the prism system 356 so that the image directed against the surface of the drum 354 is moved slowly in one direction, for example, lengthwise of the serial number, while being moved laterally back and forth in a relatively rapid manner at right angles to the first motion whereby the image directed against the surface of the drum effects a periodically repeated scan or match seeking of the surface.

The surface of the drum 354 is made with a plurality of flat sides, for example, eight, and each one of these flat sides carries a negative of a genuine image to the same scale and orientation as the positive image directed thereagainst by the lens system 352. The negatives 360 are respectively of the serial numbers of the various batches of counterfeit being tested for, or the negatives 360 comprise, in turn, a true negative of each one of the numbers indicating the denomination of the bill that the apparatus is adapted to test. It will be evident that the cyclic scanning action achieved between the positive and negative images can thus be made to identify a given bill as being of a particular denomination or as bearing a serial number identical to a known counterfeit bill serial number.

The matching action is achieved by positioning a photocell 362 in fixed position in the inside of the drum 354 and with a lens or a lens system 364 directing the light from the superimposed and negative images at the drum surface to the photocell. The output of the photocell 362 is connected to an amplifier 364 which in turn is connected to the operating coil of a galvanometer 366 having a needle 368 adapted to electrically engage an arcuately short contact plate 370, all in the manner described in conjunction with the apparatus in Fig. 11. In addition, the output of the amplifier 364 can be connected to an integrator 372 which measures and adds up the changes in voltage in the output of the amplifier as a result of spurious or false matches between the positive and negative images being matched, the output of the integrator 372 passing to a voltage sensitive relay 374 connected in series with a time response relay 376 controlling the flow of voltage from a low-power-in circuit 98 to a low-power-out circuit 198 when a proper match has been achieved for a proper time. Also, as previously described in conjunction with the apparatus in Fig. 11, the galvanometer 366 can be employed without the integrator and voltage sensitive relay, and in some cases the integrator 372 and voltage sensitive relay 374 can be utilized without the galvanometer 366.

In order to properly examine the bill B, it is necessary, of course, that the bill B be at rest, and this is achieved in the form of the invention illustrated by the provision of a micro-switch 378 adapted to be operated by having the front edge of the bill strike it, the closing of the micro-switch connecting a low-power-in circuit 98 to the operating coil of a normally closed relay 380 (which may be part of relay 28), which cuts off the power-in circuit 26 to the belt driving motor 30 to stop the belts 48 and 50 and to thus stop the bill B. In addition to operating the relay 380, the low-power-in circuit 98 is connected to a motor 382 which drives through a Geneva movement 384 to periodically advance the drum 354 to bring a new negative 360 in turn into matching position. The drive of the motor 382 through the Geneva movement 384 is such, as will be understood, so that each negative 360 in turn is presented to the matching position so that a series of any desired number of negatives can be examined for either a serial number comparison with the bill being tested, or for a denomination number comparison, or both. The dwell of each negative in the matching position is sufficient for a test thereon to be made.

Of course, the drum 354 can have any desired number of faces or sides to perform the operation desired, but after the drum has completed its rotation, a fixed pin 386 thereon engages with a normally open micro-switch 388 to energize operating coil 390 of a relay 392 which opens to break off the flow of current through the relay 380 and motor 382 so that the belt driving motor 30 is again driven to pass the bill to the next test apparatus or to the genuine bill compartment 74 or the reject chute 76. The relay 392 is of the time delay close type so that the relay does not close once it is opened until the bill B has passed beyond the micro-switch 378.

From the foregoing, it will be recognized that the various objects of my invention have been achieved by the provision of a plurality of tests for determining the genuineness particularly of paper currency, with the apparatus being automatic in charatcer and of high efficiency. The invention particularly teaches the use of plurality of tests upon a paper bill with the bill being accepted as genuine only if it passes a selected number of tests, and with the apparatus operating to make change, deliver merchandise, or perform some other services if the bill tested is accepted as genuine. The apparatus can be operated to automatically compensate for the oldness or newness of the bill being tested.

While in accord with the Patent Statutes, I have particularly illustrated and described certain best known embodiments of my invention, it is to be particularly understood that I am not to be limited thereto or thereby.

I claim:

1. Apparatus for identifying a paper money note as genuine, and for delivering article, comprising a slide for receiving the note, a casing supporting the slide for movement into or partially out of the casing, electric power means, an electric switch in the casing and actuated by inward movement of the slide, conveyor means connected to the power means by the closing of the switch for removing the note from the slide and for conveying it along a path in the casing, means positioned on the path for measuring the thickness of a selected portion of the note, a stepping switch, contact means operated by the means for measuring the thickness if within the proper range of thickness for operating the stepping switch one step, means positioned along the path for directing ultraviolet light against the note, means for polarizing the light reflected from the note, narrow band pass means for filtering the polarized light, photocell and amplifier means for picking up the filtered light, a second contact means operated by the amplifier means if the filtered light is maintained in the proper range for the proper time to operate the stepping switch another step, means positioned along the path for optically matching a positive image of at least a portion of the note being tested for genuiness with a negative image of the same portion of a genuine note, photocell, amplifier and contact means actuated if a proper match is hit for a proper time for actuating the stepping switch another step, solenoid-moved gate means connected to the power means by the stepping switch if it has been advanced a sufficient number of steps for receiving the note from the conveyor means and for directing it to a cash box in the casing, chute means for receiving the note and returning it to the outside of the casing if the gate means are not operated, and electrically operated means electrically connected with the gate means for discharging articles from the casing upon operation of the gate means.

2. Apparatus for identifying a paper money note as genuine, and for delivering articles, comprising a slide for receiving the note, a casing supporting the slide for movement into or partially out of the casing, electric power means, an electric switch in the casing and actuated by inward movement of the slide, conveyor means connected to the power means by the closing of the switch for removing the note from the slide and for conveying it along a path in the casing, means positioned on the path for measuring the thickness of a selected portion of the note, a stepping switch, contact means operated by the means for measuring the thickness if within the proper range of thickness for operating the stepping switch one step, means positioned along the path for optically matching a positive image of at least a portion of the note being tested for genuineness with a negative image of the same portion of a genuine note, photocell, amplifier and contact means actuated if a proper match is hit for a proper time for actuating the stepping switch another step, solenoid-moved gate means connected to the power means by the stepping switch if it has been advanced a sufficient number of steps for receiving the note from the conveyor means and for directing it to a cash box in the casing, chute means for receiving the note and returning it to the outside of the casing if the gate means are not operated, and electrically operated means electrically connected with the gate means for delivering articles from the casing upon operation of the gate means.

3. Apparatus for identifying a paper money note as genuine, and for delivering articles, comprising a slide for receiving the note, a casing supporting the slide for movement into or partially out of the casing, electric power means, an electric switch in the casing and actuated by inward movement of the slide, conveyor means connected to the power means by the closing of the switch for removing the note from the slide and for conveying it along a path in the casing, means positioned on the path for measuring the thickness of a selected portion of the note, a stepping switch, contact means operated by the means for measuring the thickness if within the proper range of thickness for operating the stepping switch one step, solenoid-moved gate means connected to the power means by the stepping switch if it has been advanced one step for receiving the note from the conveyor means and for directing it to a cash box in the casing, chute means for receiving the note and returning it to the outside of the casing if the gate means are not operated, and electrically operated means electrically connected with the gate means for discharging articles from the casing upon operation of the gate means.

4. Apparatus for identifying a paper money note as genuine, and for delivering articles, comprising a slide for receiving the note, a casing supporting the slide for movement into or partially out of the casing, electric power means, an electric switch in the casing, conveyor means connected to the power means by the closing of the switch for conveying the note along a path in the casing, a stepping switch, indicating means for performing a physical test on the note as it is conveyed along the path, means for operating the stepping switch one step if the last-named means are within selected limits, solenoid-moved gate means connected to the power means by the stepping switch if it has been advanced one step for receiving the note from the conveyor means and for directing it to a cash box in the casing, chute means for receiving the note and returning it to the outside of the casing if the gate means are not operated, and electrically operated means electrically connected with the gate means for discharging articles from the casing upon operation of the gate means.

5. Apparatus for identifying a paper money note as genuine, and for delivering articles, comprising a slide for receiving the note, a casing supporting the slide for movement into or partially out of the casing, electric power means, an electric switch in the casing and actuated by inward movement of the slide, conveyor means connected to the power means by the closing of the switch for removing the note from the slide and for conveying it along a path in the casing, a stepping switch, measuring means positioned along the path and adapted to measure a physical dimension on the note, means connecting the power means to the stepping switch to move it one step if the dimension determined by the measuring means is within selected limits, ultra violet means positioned along the path and directing ultra-violet light against the note, means connecting the power means to the stepping switch to move it one step if the light reflected by the note is within selected limits, matching means positioned along the path and adapted to compare a printed portion of the note being tested with a similar portion of a genuine note, means connecting the power means to the stepping switch to move it one step if the printing of the note being tested matches wtihin selected limits with a genuine note, solenoid-moved gate means connected to the power means by the stepping switch if it has been advanced a sufficient number of steps for receiving the note from the conveyor means and for directing it to a cash box in the casing, chute means for receiving the note and returning it to the outside of the casing if the gate means are not operated, and electrically operated means electrically connected with the gate means for discharging articles from the casing upon operation of the gate means.

6. Apparatus for identifying a paper money note as genuine, and for delivering articles, comprising means for conveying a note along a path, a stepping switch, electric power means, ultra-violet means positioned along the path and directing ultra-violet light against the note, means connecting the power means to the stepping switch to move it one step if the light reflected by the note is within selected limits, matching means positioned along the path and adapted to compare a printed portion of the note being tested with a similar portion of a genuine note, means connecting the power means to the stepping switch to move it one step if the printing of the note being tested matches within selected limits with a genuine note, a cash box, solenoid-moved gate means connected to the power means by the stepping switch if it has been advanced a sufficient number of steps for receiving the note from the conveyor means and for directing it to the cash box, discharge chute means for receiving the note if the gate means are not operated, and electrically operated means electrically connected with the gate means for discharging articles upon operation of the gate means.

7. Apparatus for identifying a paper money note as genuine, and for delivering articles, comprising a slide for receiving the note, a casing supporting the slide for movement into or partially out of the casing, electric power means, an electric switch, conveyor means connected to the power means by the closing of the switch for conveying the note along a path in the casing, a stepping switch, light-generating means positioned along the path and directing light against the note, light responsive contact means in the path of the reflected light and connecting the power means to the stepping switch to move it one step if the light reflected by the note is within selected limits, solenoid-moved gate means connected to the power means by the stepping switch if it has been advanced one step for receiving the note from the conveyor means and for directing it to a cash box in the casing, chute means for receiving the note and returning it to the outside of the casing if the gate means are not operated, and electrically operated means electrically connected with the gate means for discharging articles from the casing upon operation of the gate means.

8. The combination in apparatus for determining the genuineness of a paper money note, of means for receiving the note, means for directing light against the note while held by the receiving means, means for determining if the light from the note is within required limits of a genuine note, means for determining if the physical dimensions of the printing on the note while held by the receiving means is within the required limits of a genuine note, means responsive to the determining means for discharging the note from the receiving means and the apparatus if the determining means show the note is not within the required limits of a genuine note, means for removing the note from the receiving means and retaining it in the apparatus if the determining means show the note is within the required limits of a genuine note, and means operated by the last-named means for delivering articles from the apparatus.

References Cited in the file of this patent

UNITED STATES PATENTS

| | | |
|---|---|---|
| 935,963 | Cohen | Oct. 5, 1909 |
| 1,341,463 | Hazard | May 25, 1920 |
| 1,555,249 | Pickard | Sept. 29, 1925 |
| 1,634,074 | Labombarde | June 28, 1927 |
| 1,751,120 | Wurzbach | Mar. 18, 1930 |
| 1,756,016 | Wright | Apr. 29, 1930 |
| 1,819,719 | Schopper | Aug. 18, 1931 |
| 1,824,745 | Allen | Sept. 22, 1931 |
| 1,943,940 | Macadie | Jan. 16, 1934 |
| 2,114,867 | Wilson | Apr. 19, 1938 |
| 2,138,645 | Rey | Nov. 29, 1938 |
| 2,160,603 | Sagbeer | May 30, 1939 |
| 2,215,805 | Wills | Sept. 24, 1940 |
| 2,246,501 | Bradner | June 24, 1941 |
| 2,251,828 | Hammond | Aug. 5, 1941 |
| 2,263,017 | Sparrow | Nov. 18, 1941 |
| 2,292,628 | Fry | Aug. 11, 1942 |
| 2,293,017 | Herman | Aug. 18, 1942 |
| 2,300,695 | Park | Nov. 3, 1942 |
| 2,311,101 | Tuttle | Feb. 16, 1943 |
| 2,319,108 | Broido | May 11, 1943 |
| 2,319,833 | Troy | May 25, 1943 |
| 2,323,647 | Colson | July 6, 1943 |
| 2,352,650 | Metcalf | July 4, 1944 |
| 2,381,990 | Stevens | Aug. 14, 1945 |
| 2,399,582 | Stevens | Apr. 30, 1946 |
| 2,429,159 | Hayes | Oct. 14, 1947 |
| 2,454,628 | Braun | Nov. 23, 1948 |
| 2,486,845 | Herzog | Nov. 1, 1949 |
| 2,522,544 | Seyboth | Sept. 19, 1950 |
| 2,565,734 | Lundahl | Aug. 28, 1951 |
| 2,627,961 | Burnside | Feb. 10, 1953 |
| 2,646,717 | Selgin | July 28, 1953 |
| 2,659,470 | Du Pont | Nov. 17, 1953 |
| 2,679,317 | Roop | May 25, 1954 |

FOREIGN PATENTS

| | | |
|---|---|---|
| 722,384 | Great Britain | Jan. 26, 1955 |